US00RE35939E

United States Patent [19]

Fukuda et al.

[11] E Patent Number: Re. 35,939

[45] Reissued Date of Patent: Oct. 27, 1998

[54] POLYESTER RESIN, COMPOSITIONS THEREOF AND SEALANT MADE THEREFROM

[75] Inventors: Kouji Fukuda, Ohtsu; Shigeharu Sugihara, Iwakuni; Takeshi Kamoto, Ohara-gun; Keiji Mori, Ohtsu; Seiki Nishihara, Ohtsu; Katsuya Emoto, Ohtsu; Toshikazu Nishiwaki, Ohtsu; Hiroshi Takeuchi, Ohtsu, all of Japan

[73] Assignee: Toyo Boseki Kabushiki Kaisha, Japan

[21] Appl. No.: 782,429

[22] Filed: Jan. 15, 1997

Related U.S. Patent Documents

Reissue of:

[64] Patent No.: 5,382,652
Issued: Jan. 17, 1995
Appl. No.: 860,044
Filed: Mar. 30, 1992

[30] Foreign Application Priority Data

| | | | |
|---|---|---|---|
| Apr. 1, 1991 | [JP] | Japan | 3-096248 |
| Aug. 5, 1991 | [JP] | Japan | 3-220990 |
| Oct. 21, 1991 | [JP] | Japan | 3-302467 |

[51] Int. Cl.[6] ..... C08G 63/18; B32B 31/20

[52] U.S. Cl. ..... 528/308.6; 528/272; 528/302; 528/308; 528/308.6; 525/437; 525/444; 525/448; 427/207.1; 156/308.2

[58] Field of Search ..... 528/272, 302, 528/308, 308.6; 525/437, 444, 448; 427/207.1; 156/308.2

[56] References Cited

U.S. PATENT DOCUMENTS

| | | |
|---|---|---|
| 3,502,623 | 3/1970 | Hurworth . |
| 4,012,363 | 3/1977 | Brüning et al. . |
| 4,031,165 | 6/1977 | Saiki et al. . |
| 4,094,721 | 6/1978 | Sturm et al. . |
| 4,167,395 | 9/1979 | Engelhardt et al. . |
| 4,217,440 | 8/1980 | Barkey . |
| 4,298,724 | 11/1981 | Sommerfeld et al. . |
| 4,426,478 | 1/1984 | Noyes et al. . |
| 4,487,909 | 12/1984 | Coughlin et al. . |
| 4,500,575 | 2/1985 | Taira et al. . |
| 4,581,093 | 4/1986 | Noyes et al. . |
| 4,585,854 | 4/1986 | Tung et al. . |

FOREIGN PATENT DOCUMENTS

| | | |
|---|---|---|
| A-0034919 | 9/1981 | European Pat. Off. . |
| 1 570 838 | 1/1970 | Germany . |
| 60-206859 | 10/1985 | Japan . |
| 63-81042 | 4/1988 | Japan . |

OTHER PUBLICATIONS

Research Disclosure No. 19624, Havant Hampshire, GB, "Method for Making Branched Polyesters" as disclosed by K.T. Barkey, Aug. 1980, pp. 337–338.

European Search Report (EP 92 10 5492) dated Nov. 12, 1992.

*Primary Examiner*—Samuel A. Acquah
*Attorney, Agent, or Firm*—Leydig, Voit & Mayer, Ltd.

[57] ABSTRACT

A polyester resin (A) having branched chain, a reduction viscosity (η sp/c) of not less than 0.7, and a Z average molecular weight (Mz) relative to standard polystyrene of not less than $250\times10^3$ and not more than $800\times10^3$, a polyester resin composition comprised of resin (A) and a polyester resin (B) without branched chain and having a reduction viscosity (η sp/c) of not less than 0.7., and a polyester resin composition comprised of resin (A) and a polyester resin (C) having branched chain and a melting point lower than that of the polyester resin (A). The sealant made from the polyester resin (A), or the resin compositions of the present invention is superior in heat-sealing properties, flavor retention, and film moldability (extrusion processing characteristics), and is suitable for a sealant for paper and plastic food containers.

23 Claims, No Drawings

POLYESTER RESIN, COMPOSITIONS THEREOF AND SEALANT MADE THEREFROM

Matter enclosed in heavy brackets [ ] appears in the original patent but forms no part of this reissue specification; matter printed in italics indicates the additions made by reissue.

FIELD OF THE INVENTION

The present invention relates to a novel polyester resin, compositions thereof and polyester resin sealants made therefrom. More specifically, the present invention relates to a polyester resin particularly suitable for a sealant for paper and plastic food containers, which has excellent heat-sealing properties, flavor retention, and film moldability (extrusion processing characteristics), to compositions thereof, and to polyester resin sealants made from them.

BACKGROUND OF THE INVENTION

There have been widely used paper food containers and plastic food containers for weight saving, as well as reduction of production and distribution costs of containers. Traditionally, polyethylenes have been used for imparting heat-sealing properties to the innermost layer of paper containers and plastic containers. Polyethylenes have excellent heat-sealing properties, and exhibit superior film moldability upon laminating with paper or plastic, which contributes to easy processing and good productivity. For this reason, polyethylenes have been used for a variety of purposes in this field.

In the meantime, due to the widened taste of consumers toward natural fruit juices and alcoholic beverages to be contained in paper and plastic containers, a sealant superior to polyethylenes has been demanded. The reason for such demand is that while polyethylenes have the above-mentioned superior properties, they have defects in that they adsorb flavor of beverages, cause change of the taste and/or flavor of the beverages, and lose original flavor of the beverages through migration of odor peculiar to the polyethylenes into the beverages. When compared with other containers such as glass bottles and PET bottles, polyethylenes are poor in flavor retention, and an improvement in this aspect has been strongly demanded.

On the other hand, polyester resins show good flavor retention as compared with polyethylenes, and their use as heat-sealants for food containers has already been proposed in, for example, Japanese Unexamined Patent Publication Nos. 206859/1985 and 81042/1988. While polyester resins are superior in heat-sealing properties and flavor retention, when melt-extruded on paper or a plastic film, they accompany great neck-in at the bottom of T-die. Therefore, a high-speed molding into a film which is available with polyethylenes is extremely difficult with polyesters, which can result in poor productivity.

SUMMARY OF THE INVENTION

In view of the above-described problems, the present inventors have conducted intensive studies on polyester resin sealants excellent in heat-sealing properties, flavor retention and film moldability (extrusion processing characteristics), and found that a specific polyester resin having an adequate amount of branched chain, an appropriate reduction viscosity and an appropriate Z average molecular weight is particularly excellent as a sealant for the innermost layer of food containers, which resulted in the completion of the invention.

DETAILED DESCRIPTION OF THE INVENTION

The present invention relates to a polyester resin (A) having branched chain, a reduction viscosity (η sp/c) of not less than 0.7, and a Z average molecular weight (Mz) relative to standard polystyrene of not less than $250\times10^3$ and not more than $800\times10^3$, a polyester resin composition comprised of the polyester resin (A) and a polyester resin (B) without branched chain and having a reduction viscosity (η sp/c) of not less than 0.7, a polyester resin composition comprised of the polyester resin (A) and a polyester resin (C) having branched chain and a melting point lower than that of the polyester resin (A), and sealants made from the polyester resin (A), or above-mentioned resin compositions.

The reduction viscosity (η sp/c) of the specific polyester resin of the present invention is not less than 0.70, preferably not less than 0.75, and more preferably not less than 0.80, and the Z average molecular weight (Mz) relative to standard polystyrene is not less than $250\times10^3$ and not more than $800\times10^3$, preferably not less than $250\times10^3$ and not more than $600\times10^3$, and more preferably not less than $280\times10^3$ and not more than $600\times10^3$ (particularly $550\times10^3$). Where the reduction viscosity of the polyester resin is less than 0.7, extrusion processing characteristics become poor, and so do physical properties of the resin. The Z average molecular weight (Mz) is critical in the present invention, and where it is less than $250\times10^3$, extrusion processing characteristics of film become poor, necking upon film molding occurs, and normal films cannot be produced. On the other hand, where the Z average molecular weight (Mz) exceeds $800\times10^3$, heat-sealing properties and drawing properties become undesirably degraded.

The specific polyester resin of the present invention is, for example, a polyester comprised of acid component mainly consisting of aromatic dicarboxylic acid containing terephthalic acid as the main component, and glycol component mainly comprised of ethylene glycol, and contains 0.1–1.5 mol % of polycarboxylic acid, polyol, or oxycarboxylic acid, all of which having 3 or more functional groups, relative to the entire acid component or the entire glycol component. As the acid component, said polyester resin contains aromatic dicarboxylic acid mainly comprised of terephthalic acid, in a proportion of 95–100 mol %, and aliphatic and/or alicyclic dicarboxylic acid in a proportion of less than 5 mol %. The proportion of terephthalic acid in the aromatic dicarboxylic acid is 60–90 mol %, preferably 65–87 mol % relative to the entire acid component. The aromatic dicarboxylic acid is exemplified by orthophthalic acid, isophthalic acid, 1,5-naphthalenedicarboxylic acid, and so on besides terephthalic acid. Particularly, a co-use of terephthalic acid and isophthalic acid is desirable, where terephthalic acid is used in a proportion of 60–90 mol %, particularly 65–87 mol %, and isophthalic acid is used in a proportion of 10–40 mol %, particularly 13–35 mol %. The aliphatic or alicyclic dicarboxylic acid to be co-used with the aromatic dicarboxylic acid is exemplified by succinic acid, adipic acid, sebacic acid, azelaic acid, dodecanedioic acid, and cyclohexanedicarboxylic acid. Where aromatic dicarboxylic acid is contained in a proportion of less than 95 mol % relative to the entire acid component, the glass transition temperature of the resin becomes undesirably low, and so do flavor retention and film moldability. On the other hand, where terephthalic acid in the aromatic dicarboxylic acid is less than 60 mol %, film moldability becomes undesirably poor, and so do mechanical properties of the film.

The glycol component of the polyester resin is mainly comprised of ethylene glycol, and its proportion to the glycol component is 90–100 mol %, preferably 92–100 mol %. As the glycol component, other glycols such as diethylene glycol, 1,4-butanediol, propylene glycol, and 1,4-cyclohexanedimethanol may be polymerized in a proportion of less than 10 mol %. Where these components exceed 10 mol %, flavor retention becomes undesirably poor.

With respect to the polyester resin, it is desirable that polycarboxylic acid, polyol or oxycarboxylic acid, all of which having 3 or more functional groups, should be contained in a proportion of 0.1–1.5 mol %, preferably 0.2–1.0 mol % relative to the entire acid component or the entire glycol component, in order to include branched chain. The use of polycarboxylic acid, polyol, or oxycarboxylic acid, all of which having 3 or more functional groups, is critical for the improvement of the film moldability (extrusion processing characteristics) of the polyester resin of the present invention, and when contained in an amount of less than 0.1 mol %, the effect cannot be expected, while when contained in an amount of more than 1.5 mol %, heat-sealing properties become drastically degraded and gel substances are produced, despite the improved film moldability.

The polycarboxylic acid having 3 or more functional groups is exemplified by cyclohexanetricarboxylic acid, trimellitic acid, trimesic acid, pyromellitic acid, and their derivatives; polyol having 3 or more functional groups is exemplified by glycerin, trimethylolpropane, pentaerythritol and their derivatives; and oxycarboxylic acid having 3 or more functional groups is exemplified by β-hydroxypropionic acid, 5-oxyethoxyisophthalic acid, 3,4-dihydroxybenzoic acid, dihydroxypivalic acid, ε-hydroxypropionic acid and their derivatives.

As the method for obtaining the polyester resin having the aforementioned characteristics, usable are conventional methods for producing polyesters, though accompanied by additional steps of using a given amount of polycarboxylic acid or polyol as a branching agent, and optionally, solid phase polymerization subsequent to melt condensation polymerization. However, any method can be employed so long as the reduction viscosity and Z average molecular weight are within the range specified above. For the improvement of operability, siloid and/or other inorganic and/or organic substances may be added to an extent that they are not detrimental to the characteristic properties of the polyester resin of the present invention.

A sealant made from the polyester resin of the present invention thus produced has not only excellent heat-sealing properties but also excellent flavor retention as compared with polyethylenes which have been representatively used as sealants. For example, adsorption of D-limonene as a way of evaluating flavor retention, is from one over several to one over several dozens that of polyethylene, which result indicates that the polyester resin adsorbs little flavor ingredient of fruit juice and that it hardly causes change of flavor and taste.

In the present invention, when the polyester resin (A) is combined with a polyester resin (B) having a reduction viscosity (η sp/c) of 0.7 or more and no branched chain, improved heat-sealing properties, extrusion processing characteristics and flavor retention can be achieved in good balance.

It is needed that the polyester resin (B) does not have branched chain, and has a reduction viscosity (η sp/c) of not less than 0.70, preferably not less than 0.75. Where reduction viscosity of the polyester is less than 0.7, extrusion processing characteristics become undesirably poor, so do physical properties of the resin. The proportion of aromatic dicarboxylic acid relative to the entire acid component of the aforementioned polyester resin (B) is 95–100 mol %, and aliphatic and/or alicyclic dicarboxylic acid can be contained in a proportion of less than 5 mol %. The proportion of terephthalic acid in the aromatic dicarboxylic acid is 50–90 mol %, preferably 60–85 mol % relative to the entire acid component. Where the terephthalic acid is contained in a proportion of less than 50 mol %, elongation becomes less, resulting in brittleness, and where it is more than 90 mol %, heat-sealing properties become markedly poor due to crystallizability. The aromatic dicarboxylic acid is exemplified by orthophthalic acid, isophthalic acid, 1,5-naphthalenedicarboxylic acid, and so on besides terephthalic acid. Two or more aromatic dicarboxylic acids are preferably used for the improvement of heat-sealing properties and flavor retention, with particular preference given to a co-use of terephthalic acid and isophthalic acid. The aliphatic and/or alicyclic dicarboxylic acid to be used with the aromatic dicarboxylic acid are(is) exemplified by succinic acid, adipic acid, sebacic acid, azelaic acid, dodecanedioic acid, and cyclohexanedicarboxylic acid.

The glycol component of the polyester resin (B) of the present invention mainly consists of ethylene glycol, and its proportion to the glycol component is 90–100 mol %, preferably 92–100 mol %. As the glycol component, other glycols such as diethylene glycol, 1,4-butanediol, propylene glycol, and 1,4-cyclohexanedimethanol may be copolymerized in a proportion of less than 10 mol %. Where these components exceed 10 mol %, flavor retention becomes undesirably poor.

For the improved extrusion processing characteristics, heat-sealing properties, and flavor retention in good balance, it is essential to contain polyester resin (A) and polyester resin (B) obtained as in the above. They are mixed at a weight ratio (A)/(B) of 95/5–40/60, preferably at 90/10–50/50. The ratio beyond 95/5 results in decreased heat-sealing properties, and the ratio below 40/60 results in lowered extrusion processing characteristics, giving rise to necking upon film molding. In the present invention, polyester resin (A) and polyester resin (B) may be mixed in a solid state and subjected to film molding, or the both resins may be taken out as pellets after melt kneading and subjected to film molding. For the improvement of operability, siloid and/or other inorganic and/or organic substances may be added to an extent that they are not detrimental to the characteristic properties of the polyester resin composition of the invention.

In the present invention, by combining polyester resin (C) having branched chain, and a melting point lower than that of the aforementioned polyester resin (A), with the polyester resin (A), an improvement can be also achieved in terms of heat-sealing properties, flavor retention, impact strength, and moldability which can result in an increased productivity.

The polyester resin (C) is needed to have branched chain, and a melting point lower than that of the aforementioned polyester resin (A), and preferably has a Z average molecular weight (Mz) relative to standard polystyrene of $250\times10^3$–$800\times10^3$. Specifically, it is exemplified by polyesters obtained by copolymerization of aromatic dicarboxylic acid mainly comprised of terephthalic acid and aliphatic dicarboxylic acid, glycol mainly comprised of 1,4-cyclohexanedimethanol and/or 1,4-butanediol, and polycarboxylic acid or polyol, all of which having 3 or more functional groups. The proportion of the aromatic dicarboxylic acid relative to the entire acid component is 60–100 mol %, and that of the aliphatic dicarboxylic acid to be co-used is preferably 40–0 mol %. The proportion of the terephthalic acid in the aromatic dicarboxylic acid is preferably 60–100 mol % relative to the entire acid component. The aromatic dicarboxylic acid is exemplified by orthophthalic acid, isophthalic acid, 2,6-naphthalenedicarboxylic acid besides terephthalic acid. The aromatic dicarboxylic acid to be co-used with the terephthalic acid is preferably isophthalic acid. The aliphatic dicarboxylic acid to be co-used with the aromatic dicarboxylic acid is exemplified by, for example, succinic acid, adipic acid, sebacic acid, azelaic acid, dodecanedioic acid, and cyclohexanedicarboxylic acid, with preference given to sebacic acid and adipic acid. Where the proportion of the aromatic dicarboxylic acid in the polyester resin (C) is less than 60 mol % relative to the entire acid component, the glass transition temperature of the resin becomes undesirably low, and so does flavor retention.

The glycol component of the polyester resin (C) mainly consists of aliphatic glycol having 2 to 4 carbon atoms and/or 1,4-cyclohexanedimethanol, and the proportion of these one or more kinds of glycol components in total is preferably not less than 50 mol %, preferably not less than 60 mol % relative to the entire glycol component. The glycol which can be used in a proportion of less than 50 mol % is exemplified by 1,6-hexanediol and diethylene glycol. Other known glycols may be used in a proportion of not more than 10 mol % if the use thereof does not adversely affect the characteristic properties of the resin.

With regard to the polyester (C) to be used for the polyester resin composition, polycarboxylic acid, polyol or oxycarboxylic acid, all of which having 3 or more functional groups, is preferably contained in a proportion of 0.1–1.5 mol %, preferably 0.15–1.3 mol % relative to the entire acid component or the entire glycol component. The copolymerization with polycarboxylic acid, polyol, or oxycarboxylic acid, all of which having 3 or more functional groups, is critical for the improvement of the film moldability (extrusion processing characteristics) of the polyester resin composition of the present invention, and when contained in an amount of less than 0.1 mol %, the effect cannot be expected, while when it is contained in an amount of more than 1.5 mol %, heat-sealing properties become drastically poor and gel substances are produced, despite the improved film moldability. The polycarboxylic acid having 3 or more functional groups to be used for the polyester resin (C) is exemplified by known polycarboxylic acids such as trimellitic acid and pyromellitic acid, and polyol having 3 or more functional groups is exemplified by known polyhydric alcohols such as glycerin, trimethylolpropane and pentaerythritol.

The oxycarboxylic acid having 3 or more functional groups is exemplified by β-hydroxypropionic acid, 5-oxyethoxyisophthalic acid, 3,4-dihydroxybenzoic acid, dihydroxypivalic acid, ε-hydroxypropionic acid and their derivatives.

The reduction viscosity (η sp/c) of the polyester resin (C) is not less than 0.70 and preferably not less than 0.75. Where the reduction viscosity of the polyester is less than 0.70, extrusion processing characteristics become degraded, and so do physical properties of the resin. It is essential that the melting point of the polyester resin (C) be lower than that of the polyester resin (A), and the difference between the two is preferably not less than 5° C., particularly not less than 20° C. Specifically, the melting point of the polyester resin (C) is 90°–180° C., preferably 100°–175° C. The glass transition temperature is preferably −25°–59° C., and particularly preferably −10°–45° C. Where the melting point is below 90° C. and the glass transition temperature is below −25° C., flavor retention becomes drastically poor, while where the melting point exceeds that of the polyester resin (A) or the glass transition temperature is beyond 59° C., heat-sealing properties remarkably fall. The Z average molecular weight relative to standard polystyrene of the polyester resin (C) is the same as for the polyester resin (A) and is $250\times10^3$–$800\times10^3$, preferably $250\times10^3$–$600\times10^3$, and more preferably $300\times10^3$–$550\times10^3$. Where the Z average molecular weight is below $250\times10^3$, extrusion processing characteristics of film become poor, and neck-in width widens. On the other hand, where it is beyond $800\times10^3$, gel substances are produced more often and heat-sealing properties become undesirably poor.

The polyester resin (A) and polyester resin (C) obtained as in the above are mixed at a weight ratio (A)/(C) of 95/5–60/40, preferably at 90/10–70/30. The ratio beyond 95/5 results in decreased heat-sealing properties, and the ratio below 60/40 results in lowered extrusion processing characteristics, giving rise to necking upon film molding and poor flavor retention. In the present invention, the polyester resin (A) and the polyester resin (C) may be mixed in a solid state and subjected to film molding, or the both resins may be taken out as pellets after melt kneading, and subjected to film molding. For the improvement of operability, siloid and/or other inorganic and/or organic substances may be added to an extent that they are not detrimental to the characteristic properties of the polyester resins of the invention.

The present invention is hereinafter described in detail by illustrating examples, to which the invention is not limited. The physical properties shown in the examples were measured according to the following methods.

Z average molecular weight: By gel permeation chromatography, a run-off curve was obtained, based on which the average molecular weight relative to standard polystyrene was calculated. As the average molecular weight, Z average molecular weight (Mz) obtained by the following equation was employed.

$$Mz=\Sigma WiMi^2/\Sigma WiMi$$

wherein Wi is the weight of molecules of molecular weight Mi.

Neck-in width: A polyester resin was formed into a film (40 mmϕ extruder, die slit width 200 mm×die gap 0.8 mm), and the difference between the die width and the width of the film obtained was taken as the neck-in width.

Peeling strength: Using a 20 μm-thick polyethylene terephthalate film as a protective layer, two polyester resin sealants were placed face to face, and heat sealed at 150° C.×2 sec., 2 kgf/cm$^2$. The peeling strength of the sealant obtained was measured by tensile tester (Tensilon RTM-100, Toyo Boldwin).

D-limonene adsorption: A 50 μm-thick polyester sealant film was placed in a sample bottle, added with D-limonene, one of the flavor ingredients for fruit juices, and allowed to stand at 30° C. for 2 weeks. The weight difference between before and after the immersion was calculated, which was taken as adsorption of D-limonene. A relative value based on the adsorption of polyethylene taken as 100 was calculated.

PRODUCTION EXAMPLE I

Production of Polyester Resins (a)–(i)

Dimethylterephthalate (34.36 kg), dimethylisophthalate (6.72 kg), ethylene glycol (27.28 kg), zinc acetate (87.8 g), and antimony trioxide (174.9 g) were charged in a reaction kettle equipped with a stirrer, a thermometer, and a run-off chilling machine, and transesterification was conducted for 3 hours while heat-stirring at 140°–210° C. After the completion of the transesterification, trimellitic anhydride (192 g) was added to conduct esterification over 1 hour while raising the temperature from 200° C. to 260° C. Thereafter, the pressure in the system was gradually reduced to 5 mmHg in 40 minutes. A condensation polymerization was conducted at 260° C. and 0.3 mmHg for 82 minutes to give a polyester resin (a) having a reduction viscosity of 0.90. After ethanolysis, the polyester resin (a) was subjected to composition analysis by gas chromatography. As a result, it was found that the composition of the polyester resin was terephthalic acid 84.3 mol %, isophthalic acid 15 mol %, trimellitic acid 0.7 mol %, and ethylene glycol 100 mol %. The Z average molecular weight (Mz) relative to standard polystyrene was measured by gel permeation chromatography, and it was found to be $430\times10^3$.

In the same manner as in the above, polyester resin (b)–(i) were obtained. Note that polyester resin (f) was obtained by subjecting a polyester resin having a reduction viscosity of 0.76 obtained as in the above to a solid phase polymerization at 190° C. for 7 hours.

EXAMPLE 1

The polyester resin (a) obtained according to the method of Production Example 1 was formed into a 50 μm-thick film by a 40 mmϕ extruder (Nippon Seikosho) using a die of 200 mm slit width. The resin composition and physical properties of the film are shown in Table 1. Compared with the films of Reference Examples to be mentioned later, the film showed small neck-in width, great peeling strength, and small adsorption of D-limonene, and had well-balanced properties.

EXAMPLES 2–6

Experiments were conducted using the resins (b)–(f) shown in Table 1 in the same manner as in Example 1. The results are shown in Table 1.

COMPARATIVE EXAMPLES 1 and 2

The films were formed as in Example 1 except that resins (g) and (h) shown in Table 1 were used. The resin compositions and physical properties of the films are shown in Table 1.

TABLE 1

| | Example | | | | | | Comparative Ex. | |
|---|---|---|---|---|---|---|---|---|
| | 1 | 2 | 3 | 4 | 5 | 6 | 1 | 2 |
| polyester resin | (a) | (b) | (c) | (d) | (e) | (f) | (g) | (h) |
| terephthalic acid | 84.3 | 84 | 79.5 | 69.3 | 80 | 84.7 | 85 | 85.3 |
| isophthalic acid | 15 | 15 | 20 | 30 | 20 | 15 | 15 | 15 |
| trimellitic acid | 0.7 | 1.0 | 0.5 | 0.7 | 0 | 0.3 | 0 | 0.7 |
| adipic acid | 0 | 0 | 0 | 0 | 0 | 0 | 0 | 0 |
| ethylene glycol | 100 | 100 | 100 | 100 | 99.3 | 100 | 100 | 100 |
| trimethylolpropane | 0 | 0 | 0 | 0 | 0.7 | 0 | 0 | 0 |
| reduction viscosity | 0.90 | 0.90 | 1.00 | 0.96 | 0.91 | 0.90 | 0.75 | 0.65 |
| Z average molecular weight ($\times10^3$) | 430 | 450 | 400 | 410 | 395 | 450 | 190 | 220 |
| neck-in width(mm)* | 100 | 98 | 108 | 105 | 110 | 97 | 135 | 128 |
| peeking strength (kgf/15 mm) | 2.9 | 17 | 3.1 | 3.2 | 3.0 | 2.6 | 2.7 | 2.0 |
| D-limonene adsorption | 5 | 6 | 5 | 4 | 6 | 5 | 5 | 6 |
| brittleness | fine | fine | fine | fine | fine | fine | fine | fragile |

Note*:
Measured at air gap, 100 mm and temperature, 280° C.

PRODUCTION EXAMPLE 2

Production of Polyester Resins (A-1)–(A-7)

The predetermined amounts of dimethylterephthalate, dimethylisophthalate, and ethylene glycol, zinc acetate (87.8 g), and antimony trioxide (174.9 g) were charged in a reaction kettle equipped with a stirrer, a thermometer, and a run-off chilling machine, and transesterification was conducted for 3 hours while heat-stirring at 140°–210° C. After the completion of the transesterification, trimellitic anhydride (a given amount) was added to conduct esterification over 1 hour while raising the temperature from 200° C. to 260° C. Thereafter, the pressure in the system was gradually reduced to 5 mmHg in 40 minutes. A condensation polymerization was conducted at 260° C. and 0.3 mmHg for 64 minutes to give polyester resins (A-1)–(A-7). The reduction viscosity and the Z average molecular weight of each of the polyester resins (A-1)–(A-7) obtained are shown in Table 2. After ethanolysis, the composition of each resin was determined by gas chromatography, the results of which are also shown in Table 2.

PRODUCTION EXAMPLE 3

Production of Polyester Resins (B-1) and (B-2)

The predetermined amounts of dimethylterephthalate, dimethylisophthalate, and ethylene glycol, zinc acetate (87.8 g), and antimony trioxide (174.9 g) were charged in a reaction kettle equipped with a stirrer, a thermometer, and a run-off chilling machine, and transesterification was conducted for 3 hours while heat-stirring at 140°–210° C. After the completion of the transesterification, esterification was conducted over 1 hour while raising the temperature from 200° C. to 260° C. Thereafter, the pressure in the system was gradually reduced to 5 mmHg in 40 minutes. A condensation polymerization was conducted at 260° C. and 0.3 mmHg for 200 minutes to give polyester resins (B-1) and (B-2). The reduction viscosity and the Z average molecular weight of each of the polyester resins obtained are shown in Table 2. After ethanolysis, the composition of each resin was determined by gas chromatography, the results of which are also shown in Table 2.

TABLE 2

| | | Example | | | | | Compara. Ex. | |
|---|---|---|---|---|---|---|---|---|
| | | 7 | 8 | 9 | 10 | 11 | 3 | 4 |
| | | A-1 | A-2 | A-3 | A-4 | A-5 | A-6 | A-7 |
| poly- | terephthalic acid | 86.3 | 86 | 84.1 | 79.3 | 87.0 | 87 | 86.3 |
| ester | isophthalic acid | 13 | 13 | 15 | 20 | 13 | 13 | 13 |
| resin | trimellitic acid | 0.7 | 1.0 | 0.5 | 0.7 | 0 | 0 | 0.7 |
| (A) | adipic acid | 0 | 0 | 0 | 0 | 0 | 0 | 0 |
| | ethylene glycol | 100 | 100 | 100 | 100 | 99.3 | 100 | 100 |
| | trimethylolpropane | 0 | 0 | 0 | 0 | 0.7 | 0 | 0 |
| | reduction viscosity | 0.85 | 0.80 | 0.84 | 0.80 | 0.81 | 0.75 | 0.65 |
| | Z average molecular weight ($\times 10^3$) | 480 | 400 | 450 | 390 | 460 | 180 | 240 |
| | | A-1 | A-2 | A-3 | A-4 | A-5 | A-6 | A-7 |
| poly- | terephthalic acid | 70 | 70 | 80 | 80 | 70 | 70 | 70 |
| ester | isophthalic acid | 30 | 30 | 20 | 20 | 30 | 30 | 30 |
| resin | ethylene glycol | 100 | 100 | 100 | 100 | 100 | 100 | 100 |
| (B) | reduction viscosity | 0.95 | 0.95 | 0.93 | 0.93 | 0.95 | 0.95 | 0.95 |
| (A)/(B) (weight ratio) | | 60/40 | 50/50 | 80/20 | 60/40 | 60/40 | 70/30 | 60/40 |
| neck in width (mm)* | | 100 | 110 | 107 | 112 | 102 | 130 | 125 |
| peeling strength (kgf/15 mm) | | 2.8 | 3.0 | 2.9 | 3.1 | 3.2 | 2.2 | 2.5 |
| D-limonene adsorption | | 5 | 6 | 5 | 5 | 5 | 5 | 6 |
| brittleness | | fine | fine | fine | fine | fine | fine | fine |

Note*:
Measured at air gap, 100 mm and temperature, 280° C.

EXAMPLE 7

The polyester resin (A-1) obtained in Production Example 2 and the polyester resin (B-1) obtained in Production Example 3 were mixed at a ratio of 60:40, and formed into a 50 μm-thick film by a 40 mmϕ extruder (Nippon Seikosho) using a 200 mm die. The resin composition and physical properties of the film obtained are shown in Table 2. As is evident from Table 2, the film showed small neck-in width, great peeling strength, and small adsorption of D-limonene, and had well-balanced properties as compared with the films of Comparative Examples to be mentioned later.

EXAMPLES 8–11

Compositions were obtained in the same manner as in Example 2 except that polyester resins (A-2)–(A-5) and polyesters (B-1) and (B-2) as shown in Table 2 were used. The resin compositions and physical properties of the compositions obtained are shown in Table 2.

COMPARATIVE EXAMPLES 3 and 4

Compositions were obtained in the same manner as in Example 2 except that polyester resins (A-6) and (A-7) and polyester (B-1) as shown in Table 2 were used. The resin compositions and properties of the compositions obtained are shown in Table 2.

PRODUCTION EXAMPLE 4

Production of Polyester Resin (A-8)

Dimethylterephthalate (837 parts), dimethylisophthalate (126 parts), ethylene glycol (682 parts), zinc acetate (0.44 part), and antimony trioxide (0.44 part) were charged in a reaction kettle equipped with a stirrer, a thermometer, and a chilling machine for run-off, and transesterification was conducted while heat-stirring at 140°–210° C. After the completion of the transesterification, trimellitic anhydride (6.7 parts) was added to conduct esterification over 1 hour while raising the temperature from 200° C. to 260° C. Thereafter, the pressure in the system was gradually reduced to 5 mmHg in 40 minutes. A condensation polymerization was conducted at 270° C. and 0.3 mmHg for 60 minutes to give polyester resin (A-8). After alcoholysis, the resin (A-8) was analyzed by gas chromatography. As a result, it was found that the composition of the polyester resin was terephthalic acid 86.3 mol %, isophthalic acid 13 mol %, trimellitic acid 0.7 mol %, and ethylene glycol 100 mol %. The melting point of the polyester resin (A-8) was 220° C., reduction viscosity was 0.85, the Z average molecular weight was $480\times10^3$, and the ratio of the weight average molecular weight to number average molecular weight (Mw/Mn) was 4.1.

PRODUCTION EXAMPLES 5–16

Production of Polyester Resins (A-9)–(A-15), and Polyester Resins (C-1)–C-5)

Polyester resins (A-9)–(A-15), and polyester resins (C-1)–(C-5) were obtained in the same manner as in Production Example 4 except the composition ratios shown in Table 3 and Table 4. The resin composition and physical properties of each polyester resin obtained are shown in Table 3 and Table 4.

EXAMPLES 12–17, COMPARATIVE EXAMPLES 5–9

The polyester resins (A-8)–(A-15) obtained in Production Examples 4–11 and the polyester resins (C-1)–(C-5) obtained in Production Examples 12–16 were mixed at a ratio indicated in Table 3 and Table 4, and formed into 50 μm-thick films by a 40 mm ϕ extruder (Nippon Seikosbo) using a 200 mm die. The resin compositions and physical properties of the films obtained are shown in Table 3 and Table 4.

TABLE 3

| | | Example | | | | | |
|---|---|---|---|---|---|---|---|
| | | 12 | 13 | 14 | 15 | 16 | 17 |
| | | A-8 | A-9 | A-10 | A-11 | A-12 | A-8 |
| poly-ester resin (A) | terephthalic acid | 86.3 | 86 | 84.5 | 79.3 | 87.0 | 86.3 |
| | isophthalic acid | 13 | 13 | 15 | 20 | 13 | 13 |
| | trimellitic acid | 0.7 | 1.0 | 0.5 | 0.7 | 0 | 0.7 |
| | adipic acid | 0 | 0 | 0 | 0 | 0 | 0 |
| | ethylene glycol | 100 | 100 | 100 | 100 | 99.3 | 100 |
| | trimethylol propane | 0 | 0 | 0 | 0 | 0.7 | 0 |
| | reduction viacosity | 0.85 | 0.80 | 0.84 | 0.80 | 0.81 | 085 |
| | melting point (°C.) | 220 | 219 | 215 | 208 | 222 | 220 |
| | Z average molecular weight ($\times 10^3$) | 480 | 400 | 450 | 393 | 460 | 480 |
| | Mw/Mn | 4.1 | 4.6 | 4.0 | 3.7 | 4.0 | 3.3 |
| | | C-1 | C-2 | C-1 | C-3 | C-2 | C4 |
| poly-ester resin (C) | terephthalic acid | 68.8 | 65 | 68.8 | 67.2 | 65 | 75 |
| | isophthalic acid | 0 | 9.5 | 0 | 0 | 9.5 | 24 |
| | adipic acid | 0 | 25 | 0 | 0 | 25 | 0 |
| | sebacic acid | 30 | 0 | 30 | 22 | 0 | 0 |
| | trimellitic acid | 1.2 | 0.5 | 1.2 | 0.8 | 0.5 | 1.0 |
| | 1,4-butaoediol | 0 | 100 | 0 | 60 | 100 | 62 |
| | 1,4-cyclohexane-dimethanol | 70 | 0 | 70 | 0 | 0 | 0 |
| | ethylene glycol | 30 | 0 | 30 | 43 | 0 | 0 |
| | diethylene glycol | 0 | 0 | 0 | 0 | 0 | 38 |
| | reduction viscosity | 0.94 | 0.77 | 0.94 | 1.04 | 0.77 | 1.15 |
| | melting point (°C.) | 170 | 166 | 170 | 173 | 166 | 122 |
| | glass transition temperature (°C.) | 19 | –3 | 19 | 12 | –3 | 21 |
| | Z average molecular weight ($\times 10^3$) | 510 | 300 | 510 | 520 | 300 | 543 |
| | Mw/Mn | 3.4 | 3.1 | 3.4 | 3.7 | 2.7 | 3.9 |
| (A)/(C) (mixing weight ratio) | | 80/20 | 83/17 | 75/25 | 80/20 | 90/10 | 70/30 |
| neck-in width (mm)* | | 20 | 28 | 22 | 26 | 22 | 24 |
| peeling strength (kgf/15 mm) | | 3.3 | 3.9 | 3.8 | 4.0 | 3.0 | 3.9 |
| D-limonene adsorption | | 13 | 11 | 17 | 10 | 8 | 15 |

Note*:
Measured at air gap, 50 mm and temperature, 250° C.

TABLE 4

| | | Comparative Example | | | | |
|---|---|---|---|---|---|---|
| | | 5 | 6 | 7 | 8 | 9 |
| | | A-13 | A-14 | A-15 | A-8 | A-8 |
| poly-ester resin (A) | terephthalic acid | 87 | 86.3 | 86.3 | 86.3 | 86.3 |
| | isophthalic acid | 13 | 13 | 13 | 13 | 13 |
| | trimellitic acid | 0 | 0.7 | 0.7 | 0.7 | 0.7 |
| | adipic acid | 0 | 0 | 0 | 0 | 0 |
| | ethylene glycol | 100 | 100 | 100 | 100 | 100 |
| | trimethylolpropane | 0 | 0 | 0 | 0 | 0 |
| | reduction viscosity | 0.75 | 0.82 | 0.65 | 0.85 | 0.85 |
| | melting point (°C.) | 221 | 219 | 220 | 220 | 220 |
| | Z average molecular weight ($\times 10^3$) | 180 | 430 | 243 | 480 | 480 |
| | Mw/Mn | 2.0 | 4.0 | 2.4 | 3.3 | 3.3 |
| | | C-1 | C-1 | C-1 | C-5 | A-8 |
| poly-ester resin (C) | terephthalic acid | 68.8 | 68.8 | 68.8 | 65 | 86.3 |
| | isophthalic acid | 0 | 0 | 0 | 10 | 13 |
| | adipic acid | 0 | 0 | 0 | 25 | 0 |
| | sebacic acid | 30 | 30 | 30 | 0 | 0 |

TABLE 4-continued

| | Comparative Example | | | | |
|---|---|---|---|---|---|
| | 5 | 6 | 7 | 8 | 9 |
| trimellitic acid | 1.2 | 1.2 | 1.2 | 0 | 0.7 |
| 1,4-butanediol | 0 | 0 | 0 | 100 | 0 |
| 1,4-cyclohexane-dimethanol | 70 | 70 | 70 | 0 | 0 |
| ethylene glycol | 30 | 30 | 30 | 0 | 100 |
| diethylene glycol | 0 | 0 | 0 | 0 | 0 |
| reduction viscosity | 0.94 | 0.94 | 0.94 | 0.76 | 0.85 |
| melting point (°C.) | 170 | 170 | 170 | 167 | 220 |
| glass transition temperature (°C.) | 19 | 19 | 19 | −5 | 71 |
| Z average molecular weight ($\times 10^3$) | 510 | 510 | 513 | 200 | 480 |
| Mw/Mn | 3.4 | 3.4 | 3.4 | 2.0 | 3.3 |
| (A)/(C) (mixing weight ratio) | 80/20 | 50/50 | 80/20 | 75/25 | 100/0 |
| neck-in width (mm)* | 72 | 30 | 64 | 68 | 18 |
| peeling strength (kgf/15 mm) | 3.1 | 4.0 | 3.0 | 3.3 | 1.7 |
| D-limonene adsorption | 14 | 41 | 13 | 15 | 5 |

Note*:
Measured at air gap, 50 mm and temperature, 250° C.

EXAMPLES 21–26

Experiments were conducted using resins (1)–(6) shown in Table 5 in the same manner as in Example 1. The results are shown in Table 5.

COMPARATIVE EXAMPLES 21 and 22

The films were formed as in Example 1 except that resins (7) and (8) shown in Table 5 were used. The resin compositions and physical properties of the films are shown in Table 5.

EXAMPLES 27–31

Compositions were obtained in the same manner as in Example 2 except that polyester resins (A-11)–(A-15) and polyester resin (B-1) as shown in Table 6 were used, and subjected to experiments. The results are shown in Table 6.

COMPARATIVE EXAMPLES 23 and 24

Compositions were obtained in the same manner as in Example 2 except that polyester resins (A-16) and (A-17) and polyester resin (B-1) as shown in Table 2 were used. The resin compositions and properties of the compositions obtained are shown in Table 6.

TABLE 5

| | Example | | | | | | Comparative Ex. | |
|---|---|---|---|---|---|---|---|---|
| | 21 | 22 | 23 | 24 | 25 | 26 | 21 | 22 |
| polyester resin | (1) | (2) | (3) | (4) | (5) | (6) | (7) | (8) |
| terephthalic acid | 84.3 | 84 | 79.5 | 69.3 | 80 | 84.7 | 85 | 85.3 |
| isophthalic acid | 15 | 15 | 20 | 30 | 20 | 15 | 15 | 15 |
| trimellitic acid | 0.7 | 1.0 | 0.5 | 0.7 | 0 | 0.3 | 0 | 0.7 |
| adipic acid | 0 | 0 | 0 | 0 | 0 | 0 | 0 | 0 |
| ethylene glycol | 100 | 100 | 100 | 100 | 99.3 | 100 | 100 | 100 |
| trimethylolpropane | 0 | 0 | 0 | 0 | 0.7 | 0 | 0 | 0 |
| reduction viscosity | 0.90 | 0.90 | 1.00 | 0.96 | 0.91 | 0.90 | 0.75 | 0.65 |
| Z average molecular weight ($\times 10^3$) | 420 | 480 | 340 | 440 | 410 | 280 | 100 | 210 |
| neck-in width(mm)* | 95 | 88 | 109 | 103 | 105 | 115 | 140 | 135 |
| peeking strength (kgf/15 mm) | 2.9 | 2.7 | 3.1 | 3.2 | 3.0 | 2.6 | 2.7 | 2.0 |
| D-limonene adsorption | 5 | 6 | 5 | 4 | 6 | 5 | 5 | 6 |
| brittleness | fine | fine | fine | fine | fine | fine | fine | fragile |

Note*:
Measured at air gap, 100 mm and temperature, 280° C.

TABLE 6

| | | Example | | | | | Compara. Ex. | |
|---|---|---|---|---|---|---|---|---|
| | | 27 | 28 | 29 | 30 | 31 | 23 | 24 |
| | | A-11 | A-12 | A-13 | A-14 | A-15 | A-16 | A-17 |
| poly- | terephthalic acid | 86.3 | 86 | 84.5 | 79.3 | 87.0 | 87 | 86.3 |
| ester | isophthalic acid | 13 | 13 | 15 | 20 | 13 | 13 | 13 |
| main | trimellitic acid | 0.7 | 1.0 | 0.1 | 0.7 | 0 | 0 | 0.7 |
| (A) | adipic acid | 0 | 0 | 0 | 0 | 0 | 0 | 0 |
| | ethylene glycol | 100 | 100 | 100 | 100 | 99.3 | 100 | 100 |
| | trimethylolpropane | 0 | 0 | 0 | 0 | 0.7 | 0 | 1 |
| | reduction viscosity | 0.85 | 0.80 | 0.84 | 0.80 | 0.81 | 0.75 | 0.65 |
| | Z average molecular weight($\times 10^3$) | 380 | 430 | 280 | 285 | 285 | 160 | 210 |
| | | B-1 | B-1 | B-2 | B-2 | B-1 | B-1 | B-1 |
| poly- | tertphthalic acid | 70 | 70 | 80 | 80 | 70 | 70 | 70 |
| ester | isophthalic acid | 30 | 30 | 20 | 20 | 30 | 30 | 30 |
| resin | ethylene glycol | 10 | 100 | 100 | 100 | 100 | 100 | 100 |
| (B) | reduction viscosity | 0.91 | 0.95 | 0.93 | 0.93 | 0.95 | 0.95 | 0.95 |
| (A)/(B) (weight ratio) | | 60/40 | 50/50 | 80/20 | 60/40 | 60/40 | 70/30 | 60/40 |
| neck-in width (mm)* | | 102 | 109 | 115 | 113 | 100 | 140 | 130 |
| peeling strength (kgf/15 mm) | | 2.8 | 3.0 | 2.9 | 3.1 | 3.2 | 2.2 | 2.5 |
| D-limonene adsorption | | 5 | 6 | 5 | 5 | 5 | 5 | 6 |
| brittleness | | fine | fine | fine | fine | fine | fine | fine |

Note*:
Measured at air gap, 100 mm and temperature, 280° C.

As is evident from Tables 1–6, the polyester resin of the present invention has branched chain, high reduction viscosity, and high Z average molecular weight, and has the following superior, well-balanced properties.

1. It is extremely superior in flavor retention in comparison with conventional polyethylenes.
2. It is superior in film moldability (extrusion processing characteristics), and therefore, markedly superior in productivity in comparison with conventional polyesters.
3. The adhesion strength, i.e. heat-sealing properties, of the film obtained is great.

What is claimed is:

1. A polyester resin having branched chain, a reduction viscosity (η sp/c) of not less than 0.7, a Z average molecular weight (Mz) relative to standard polystyrene of not less than $250\times10^3$ and not more than $800\times10^3$, an acid component comprising an aromatic dicarboxylic acid in a proportion of from about 95 mole percent to about 100 mole percent relative to the entire acid component, said aromatic dicarboxylic acid comprising terephthalic acid in an amount ranging from about 60 mole percent to about 90 mole percent, and said polyester resin having a glycol component comprising ethylene glycol in a proportion of from about 90 mole percent to about 100 mole percent relative to the entire glycol component.

2. A polyester resin having branched chain, a reduction viscosity (η sp/c) of not less than 0.8, a Z average molecular weight (Mz) relative to standard polystyrene of not less than $280\times10^3$ and not more than $600\times10^3$, an acid component comprising an aromatic dicarboxylic acid in a proportion of from about 95 mole percent to about 100 mole percent relative to the entire acid component, said aromatic dicarboxylic acid comprising terephthalic acid in an amount ranging from about 60 mole percent to about 90 mole percent, and said polyester resin having a glycol component comprising ethylene glycol in a proportion of from about 90 mole percent to about 100 mole percent relative to the entire glycol component.

3. A polyester resin composition comprised of a polyester resin (A) having branched chain, a reduction viscosity (η sp/c) of not less than 0.7, a Z average molecular weight (Mz) relative to standard polystyrene of not less than $250\times10^3$ and not more than $800\times10^3$, and said polyester resin (A) having a glycol component comprising ethylene glycol in a proportion of from about 90 mole percent to about 100 mole percent relative to the entire glycol component, and a polyester resin (B) without branched chain and having a reduction viscosity (η sp/c) of not less than 0.7.

4. A polyester resin composition according to claim 3, wherein the ratio of the polyester resin (A) and the polyester resin (B), (A)/(B), is 95/5–40/60.

5. A polyester resin composition comprised of a polyester resin (A) having branched chain, a reduction viscosity (η sp/c) of not less than 0.7, a Z average molecular weight (Mz) relative to standard polystyrene of not less than $250\times10^3$ and not more than $800\times10^3$, and said polyester resin (A) having a glycol component comprising ethylene glycol in a proportion of from about 90 mole percent to about 100 mole percent relative to the entire glycol component, and a polyester resin (C) having branched chain, a Z average molecular weight (Mz) relative to standard polystyrene of not less than $250\times10^3$ and not more than $800\times10^3$, and a melting point lower than that of the polyester resin (A).

6. A polyester resin composition according to claim 5, wherein the ratio of the polyester resin (A) and the polyester resin (C), (A)/(C), is 95/5–60/40.

7. A polyester resin composition comprised of a polyester resin (A) having branched chain, a reduction viscosity (η sp/c) of not less than 0.7, a Z average molecular weight (Mz) relative to standard polystyrene of not less that $250\times10^3$ and not more than $800\times10^3$, and said polyester resin (A) having a glycol component comprising ethylene glycol in a proportion of from about 90 mole percent to about 100 mole percent relative to the entire glycol component, and a polyester resin (C) having branched chain and a melting point lower than that of the polyester resin (A) in a mixing weight ratio of (A)/(C)=95/5–60/40.

8. A sealant made from a polyester resin having branched chain, a reduction viscosity (η sp/c) of not less than 0.7, a Z average molecular weight (Mz) relative to standard polystyrene of not less than $250\times10^3$ and not more that $800\times10^3$, an acid component comprising an aromatic dicarboxylic acid in a proportion of from about 95 mole percent to about 100 mole percent relative to the entire acid component, said aromatic dicarboxylic acid comprising terephthalic acid in an amount ranging from about 60 mole percent to about 90 mole percent, and said polyester resin having a glycol component comprising ethylene glycol in a proportion of from about 90 mole percent to about 100 mole percent relative to the entire glycol component.

9. A sealant made from a polyester resin having branched chain, a reduction viscosity (η sp/c) of not less than 0.8, a Z average molecular weight (Mz) relative to standard polystyrene of not less than $280\times10^3$ and not more than $600\times10^3$, an acid component comprising an aromatic dicarboxylic acid in a proportion of from about 95 mole percent to about 100 mole percent relative to the entire acid component, said aromatic dicarboxylic acid comprising terephthalic acid in an amount ranging from about 60 mole percent to about 90 mole percent, and said polyester resin having a glycol component comprising ethylene glycol in a proportion of from about 90 mole percent to about 100 mole percent relative to the entire glycol component.

10. A sealant made from a polyester resin composition comprised of a polyester resin (A) having branched chain, a reduction viscosity (η sp/c) of not less than 0.7, a Z average molecular weight (Mz) relative to standard polystyrene of not less than $250\times10^3$ and not more than $800\times10^3$, and said polyester resin (A) having a glycol component comprising ethylene glycol in a proportion of from about 90 mole percent to about 100 mole percent relative to the entire glycol component, and a polyester resin (B) without branched chain which has a reduction viscosity (η sp/c) of not less than 0.7.

11. A sealant made from a polyester resin composition comprised of a polyester resin (A) having branched chain, a reduction viscosity (η sp/c) of not less than 0.7, a Z average molecular weight (Mz) relative to standard polystyrene of not less than $250\times10^3$ and not more than $800\times10^3$, and said polyester resin (A) having a glycol component comprising ethylene glycol in a proportion of from about 90 mole percent to about 100 mole percent relative to the entire glycol component, and a polyester resin (C) having branched chain and a melting point lower than that of the polyester resin (A).

12. A polyester comprising the following components:

a. an acid component comprising an aromatic dicarboxylic acid in a proportion of from about 95 mole percent to about 100 mole percent relative to the entire acid component, said aromatic dicarboxylic acid comprising terephthalic acid in a proportion of from about 60 mole percent to about 90 mole percent relative to the entire acid component and an aliphatic and/or alicyclic dicarboxylic acid in a proportion of less than 5 mole percent relative to the entire acid component;

b. a glycol component comprising ethylene glycol in a proportion of from about 90 mole percent to about 100 mole percent relative to the entire glycol component, and less than 10 mole percent glycols relative to the entire glycol component selected from the group consisting of diethylene glycol, 1,4-butanediol, propylene glycol, and 1,4-cyclohexanedimethanol; and c. a compound having 3 or more functional groups selected from the group consisting of polycarboxylic acid, polyol, and oxycarboxylic acid in a proportion of from about 0.1 mole percent to about 1.5 mole percent relative to either the entire acid component or the entire glycol component.

*13. A polyester resin having branched chain, a Z average molecular weight (Mz) relative to standard polystyrene of not less than $250\times10^3$ and not more than $800\times10^3$, an acid component comprising an aromatic dicarboxylic acid in a proportion of from about 95 mole percent to about 100 mole percent relative to the entire acid component, said aromatic dicarboxylic acid comprising terephthalic acid in an amount ranging from about 60 mole percent to about 90 mole percent, and said polyester resin having a glycol component comprising ethylene glycol in a proportion of from about 90 mole percent to about 100 mole percent relative to the entire glycol component.*

*14. A polyester resin having branched chain, a Z it average molecular weight (Mz) relative to standard polystyrene of not less than $280\times10^3$ and not more than $600\times10^3$, an acid component comprising an aromatic dicarboxylic acid in a proportion of from about 95 mole percent to about 100 mole percent relative to the entire acid component, said aromatic dicarboxylic acid comprising terephthalic acid in an amount ranging from about 60 mole percent to about 90 mole percent, and said polyester resin having a glycol component comprising ethylene glycol in a proportion of from about 90 mole percent to about 100 mole percent relative to the entire glycol component.*

*15. A polyester resin composition comprised of a polyester resin (A) having branched chain, a Z average molecular weight (Mz) relative to standard polystyrene of not less than $250\times10^3$ and not more than $800\times10^3$, and said polyester resin (A) having a glycol component comprising ethylene glycol in a proportion of from about 90 mole percent to about 100 mole percent relative to the entire glycol component, and a polyester resin (B) without branched chain.*

*16. A polyester resin composition according to claim 15, wherein the ratio of the polyester resin (A) and the polyester resin (B), (A)/(B), is 95/5–40/60.*

*17. A polyester resin composition comprised of a polyester resin (A) having branched chain, a Z average molecular weight (Mz) relative to standard polystyrene of not less than $250\times10^3$ and not more than $800\times10^3$, and said polyester resin (A) having a glycol component comprising ethylene glycol in a proportion of from about 90 mole percent to about 100 mole percent relative to the entire glycol component, and a polyester resin (C) having branched chain, a Z average molecular weight (Mz) relative to standard polystyrene of not less than $250\times10^3$ and not more than $800\times10^3$, and a melting point lower than that of the polyester resin (A).*

*18. A polyester resin composition according to claim 17, wherein the ratio of the polyester resin (A) and the polyester resin (C), (A)/(C), is 95/5–60/40.*

*19. A polyester resin composition comprised of a polyester resin (A) having branched chain, a Z average molecular weight (Mz) relative to standard polystyrene of not less than $250\times10^3$ and not more than $800\times10^3$, and said polyester resin (A) having a glycol component comprising ethylene glycol in a proportion of from about 90 mole percent to about 100 mole percent relative to the entire glycol component, and a polyester resin (C) having branched chain and a melting point lower than that of the polyester resin (A) in a mixing weight ratio of (A)/(C)=95/5–60/40.*

*20. A sealant made from a polyester resin having branched chain, a Z average molecular weight (Mz) relative to standard polystyrene of not less than $250\times10^3$ and not more than $800\times10^3$, an acid component comprising an*

*aromatic dicarboxylic acid in a proportion of from about 95 mole percent to about 100 mole percent relative to the entire acid component, said aromatic dicarboxylic acid comprising terephthalic acid in an amount ranging from about 60 mole percent to about 90 mole percent, and said polyester resin having a glycol component comprising ethylene glycol in a proportion of from about 90 mole percent to about 100 mole percent relative to the entire glycol component.*

*21. A sealant made from a polyester resin having branched chain, a Z average molecular weight (Mz) relative to standard polystyrene of not less than $280\times10^3$ and not more than $600\times10^3$, an acid component comprising an aromatic dicarboxylic acid in a proportion of from about 95 mole percent to about 100 mole percent relative to the entire acid component, said aromatic dicarboxylic acid comprising terephthalic acid in an amount ranging from about 60 mole percent to about 90 mole percent, and said polyester resin having a glycol component comprising ethylene glycol in a proportion of from about 90 mole percent to about 100 mole percent relative to the entire glycol component.*

*22. A sealant made from a polyester resin composition comprised of a polyester resin (A) having branched chain, a Z average molecular weight (Mz) relative to standard polystyrene of not less than $250\times10^3$ and not more than $800\times10^3$, and said polyester resin (A) having a glycol component comprising ethylene glycol in a proportion of from about 90 mole percent to about 100 mole percent relative to the entire glycol component, and a polyester resin (B) without branched chain.*

*23. A sealant made from a polyester resin composition comprised of a polyester resin (A) having branched chain, a Z average molecular weight (Mz) relative to standard polystyrene of not less than $250\times10^3$ and not more than $800\times10^3$, and said polyester resin (A) having a glycol component comprising ethylene glycol in a proportion of from about 90 mole percent to about 100 mole percent relative to the entire glycol component, and a polyester resin (C) having branched chain and a melting point lower than that of the polyester resin (A).*

* * * * *

UNITED STATES PATENT AND TRADEMARK OFFICE

CERTIFICATE OF CORRECTION

PATENT NO. : RE 35,939

DATED : October 27, 1998

INVENTOR(S) : FUKUDA et al.

It is certified that an error appears in the above-identified patent and that said Letters Patent is hereby corrected as shown below:

IN THE CLAIMS:

In claim 14, column 18, line 15: delete "it"

Signed and Sealed this

Twenty-fifth Day of May, 1999

*Attest:*

Q. TODD DICKINSON

*Attesting Officer*

*Acting Commissioner of Patents and Trademarks*